United States Patent
McGreevy et al.

(10) Patent No.: US 7,574,417 B1
(45) Date of Patent: Aug. 11, 2009

(54) SELF CONFIGURATION OF EMBEDDED HISTORIANS

(75) Inventors: Robert J. McGreevy, Oswego, IL (US); Taryl J. Jasper, South Euclid, OH (US); Robert J. Herbst, Aurora, OH (US); John J. Baier, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 371 days.

(21) Appl. No.: 11/536,566

(22) Filed: Sep. 28, 2006

(51) Int. Cl.
*G05B 11/01* (2006.01)
*G05B 13/00* (2006.01)
*G06F 19/00* (2006.01)

(52) U.S. Cl. .................. 706/59; 700/8; 700/29; 700/109

(58) Field of Classification Search ............. 706/59; 700/8, 29, 95, 108, 109
See application file for complete search history.

(56) References Cited

U.S. PATENT DOCUMENTS

2004/0181294 A1  9/2004  Deitz et al.

FOREIGN PATENT DOCUMENTS

GB    2353616 A1    2/2001
WO    2004027531 A   4/2004

OTHER PUBLICATIONS

Invensys, Wonderware Plant Intelligence Solution Helps Arla Foods Deliver Fresh Milk Products to the Tables of Europe, 2005.*
BCI Technologies, Power Rich System Enterprise Edition Historian Version 1.5, 2005.*
European Search Report dated Dec. 12, 2007 for European Patent Application Serial No. 07117364.5-2221,2 Pages.

* cited by examiner

*Primary Examiner*—David R Vincent
*Assistant Examiner*—Nathan H Brown, Jr.
(74) *Attorney, Agent, or Firm*—Turocy & Watson LLP; William R. Walbrun (57) ABSTRACT

Systems and methods that configure an embedded historian(s) to a predetermined setting and an automatic propagation thereof to other embedded historians and units on the factory floor. Embedded historian can be automatically configured, and be set up as a default collection for a plant scan, such that when a plant comes on-line, embedded historians announce their presence to such plant, and are discovered thereby and configured thereby.

31 Claims, 11 Drawing Sheets

SELF CONFIGURATION OF EMBEDDED HISTORIANS

TECHNICAL FIELD

The subject invention relates generally to historian components associated with industrial controllers and more particularly to configuring of embedded historians for data collection.

BACKGROUND

Manufacturers typically require collection, analysis, and optimization of real time data from a plurality of sites that are located globally. One common solution for recording such data includes providing a local recording module that often occupies a slot in a controller backplane such as a PC-Historian. The PC-Historian(s) can communicate with controllers directly through the backplane, or can communicate remotely via a network interface. In addition, such PC-Historian can enable archiving data from the controller to an Archive Engine which provides additional storage capabilities.

Typically, such controllers are special-purpose computers utilized for controlling industrial processes, manufacturing equipment, and other factory automation, such as data collection or networked systems. At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. Differences in PLCs are typically dependent on the number of Input/Output (I/O) they can process, amount of memory, number and type of instructions, and speed of the PLC central processing unit (CPU).

In a more macro sense than the controller, businesses have become more complex in that higher order business systems or computers often need to exchange data with such controllers. For instance, an industrial automation enterprise may include several plants in different locations. Modern drivers such as efficiency and productivity improvement, and cost-reduction, are requiring manufacturers to collect, analyze, and optimize data and metrics from global manufacturing sites. For example, a food company can have several plants located across the globe for producing a certain brand of food. These factories in the past were standalone, with minimum data collection and comparison of metrics with other similar factories. In the networked world of today, manufacturers are demanding real-time data from their factories to drive optimization and productivity. Unfortunately, conventional control systems architectures are not equipped to allow a seamless exchange of data between these various components of the enterprise.

Another requirement of modern control system architectures is the ability to record and store data in order to maintain compliance with Food and Drug Administration regulations such as Regulation 21 CFR Part 11. One common solution for recording data includes providing a local recording module that often occupies a slot in a controller backplane such as a PC-Historian which is an industrial computer for the controller backplane, and employs a transitional layer to supply an indirect interface to the controller. This includes a platform that provides high speed, time series, data storage and retrieval with both local and remote control processors. The PC-Historian communicates with controllers directly through the backplane and can communicate remotely via a network interface. The PC-Historian allows archiving data from the controller to an Archive Engine which provides additional storage capabilities.

In general, conventional historian processors enable high-speed real-time data collection by communicating directly with the control processor across the backplane for fast data collection speeds. This includes handling large quantities of data over extended time periods while providing efficient storage and retrieval of process data over extended periods of time. These solutions are generally employed for electronic documentation and provide an audit trail and data flags for tracking modified, inserted, or incomplete data. In order to configure such products, a Graphical User Interface (GUI) can be provided to map controller tags defined in a local or remote processor to a data historian file.

Although historians can be configured manually for various settings, and subsequently connected to each other for propagating such settings—the manual settings associated with such processes can be both error prone and time consuming. In general, there exists no system of automatically setting/propagating configurations for a historian(s), within an industrial plant.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

The subject innovation provides for systems and methods that configure an embedded historian(s) to a predetermined setting, via a configuration component, (e.g., wherein such configuration can include automatically defining tags and discovery of values that routinely change and are to be monitored). Such configuration component can further automatically propagate the embedded historian's configuration and/or changes to other embedded historians and units on the factory floor. For example, tags in an embedded historian can be automatically created, and be set up as a default collection for a plant scan, such that when a plant comes on-line, the embedded historians announce their presence to such plant, and are discovered thereby. In general, such embedded historians (unlike conventional PC historians) supply a direct interface to controllers without employing a transitional layer, and hence provide a substantially higher data exchange rate as compared to conventional PC historians.

In a related aspect, the configuration component can program and/or modify settings associated with an embedded historian by traversing a hierarchy of embedded historians in a predetermined manner. The configuration component can be part of applications running on a control unit, which can function as a management control center for the industrial network. Moreover, such configuring component can further associate with a locator component that can detect the location of an embedded historian for a configuration thereof.

According to a further aspect, the configuration component can further employ a security component to provide security at a granular level and/or global manner for configuring the embedded historians. Such security component can define authorization, and/or privileges in accordance with the physical hierarchy of the embedded historians located at predetermined sectors of the environment, and/or assessing security levels associated with collection of particular data types. Moreover, the security component can include a log component that tracks setting manipulations for the embedded historians.

In a related aspect, the locator component can employ a trail of metadata to identify the embedded historians, and verify a respective configuration setting. Additionally, a polling/publication arrangement can also be employed, wherein the embedded historians (e.g., micro historians) identify themselves to the locator component upon occurrence of a predetermined event, and/or periodically. Subsequently, the configuration component can change a configuration/setting to be set and/or monitored. Such configuration component can further automatically propagate configuration for an embedded historian and/or changes to other embedded historians and units, on the factory floor.

Accordingly, a distributed and scalable framework can be provided, which enables data historian functionality to be efficiently incorporated at various levels of an enterprise. For example, from lower control levels of a plant, to middle tiers of the plant (which collect data from the lowest levels), and from enterprise levels that aggregate data from such lower and middle levels, the embedded historian components can interact with a configuration component, to facilitate embedded historian settings (e.g., type of data collection across an organizational hierarchy.) Such framework can employ a directory and location service to enable configuration of embedded historians and to allow automated integration at the various levels of the organization.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
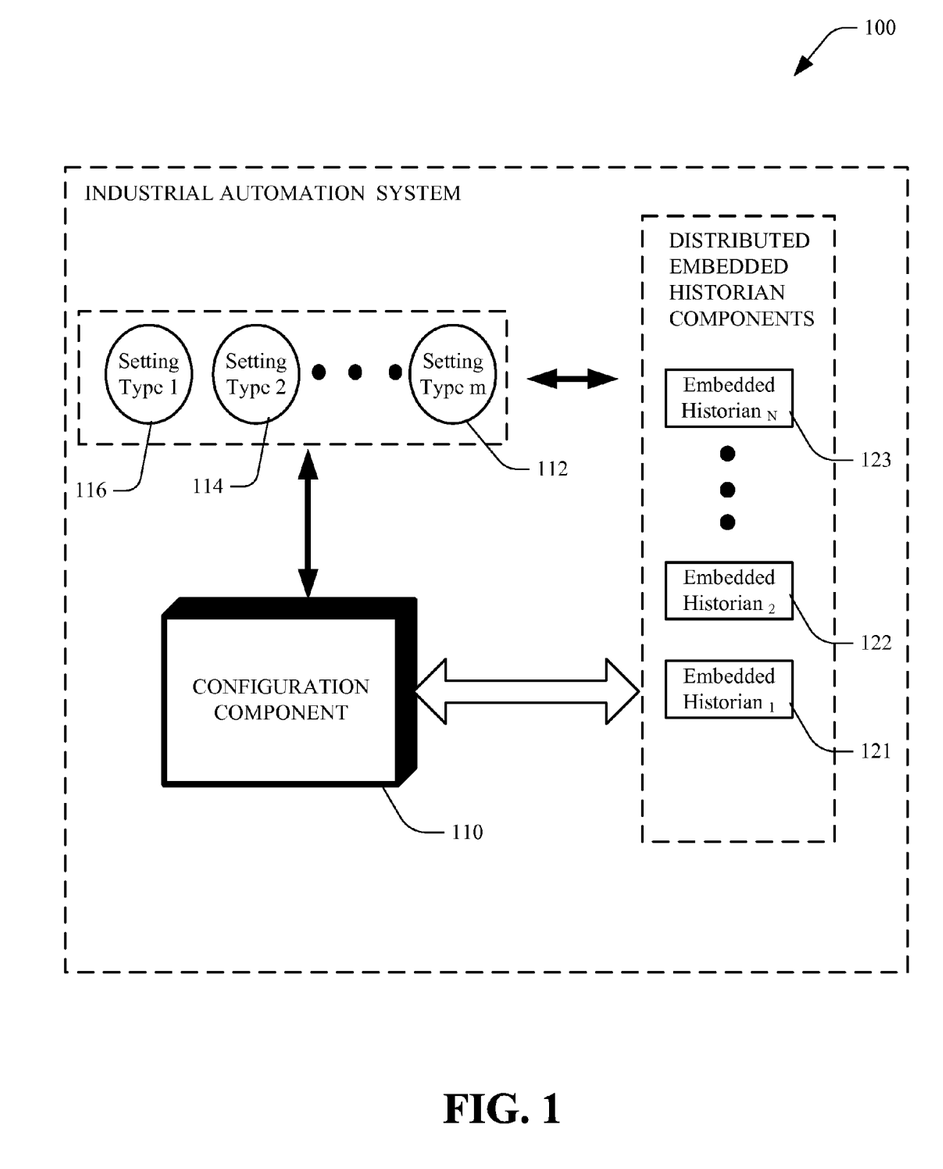
FIG. 1 is a schematic block diagram of a configuration component that can automatically configure embedded historians and propagate the embedded historian's configuration and/or changes to other embedded historians and units on the factory floor

FIG. 1 illustrates a configuration component 110 that is associated with a plant embedded historian network of an industrial automation system 100 (e.g., a network of controller devices), to facilitate configurations of embedded historians and automatically propagate such settings to other plant embedded historians within the industrial setting. The embedded historians 121, 122, 123 can be part of a hierarchically structured data model for the industrial automation system 100, wherein by employing the hierarchically structured data model the configuration component 110 can typically mitigate a requirement for an additional layer of software to collect such data regarding the embedded historians. Any of a plurality of settings 112, 114, 116 (1 thru m, where m is an integer) for collection of history data can be programmed into embedded historians 121, 122, 123, and can be automatically propagated to other industrial units that interact with such embedded historians on the factory floor. In general, such embedded historians (unlike conventional PC historians) supply a direct interface to controllers without employing a transitional layer, and hence provide a substantially higher data exchange rate as compared to conventional PC historians.

Moreover, the configuration component 110 can implement a data package (common data model that is based upon an industry standard, such as ISA_S88, ISAS95, etc. that is automatically completed and/or configured in a manner that is readily understood by designated devices/systems. For example, the data package can be formatted in accordance with a common data model that is based upon an industry standard, such as ISA S88, ISAS95, and the like. The configuration component 110 can further provide offline configuring of the embedded historians 121, 122, 123 that can include, editing process variables, automation device names, creating tag references, data models, hierarchy, simulation of industrial processes, and the like. In addition, the configuration can enable a user to program the relationship among embedded historians, controllers, industrial devices (e.g., a sensor) and other logical variables, to generate a reporting event (e.g., type of data being collected) and specific data structures related to the industrial plant.

The configuration component 110 can create and/or modify a tag, a name or reference for a device and/or logical variable related to embedded historians(s) (e.g., without a physical address such as a network address, an Internet protocol (IP) address, and the like) for such device and/or logical variable. Moreover, the configuration component 110 can create and/or modify a tag associated with an embedded historian within an industrial automation environment, and physical location of such tag within the hierarchical structure.

For example, the configure component 110 can allow creation of processing parameters associated with the embedded historians such as for example: tag names, data models, hierarchies, and the like—without typically employing any information related to the physical location of each input and/or output. Such configuration component can further automatically propagate the embedded historian's configuration and/or changes to other embedded historians and units on the factory floor. Tags in an embedded historian (e.g., a microhistorian) can be automatically created, and set up as a default collection for a plant scan, such that when a plant comes on-line, the embedded historians announce their presence thereto. Such identification can occur via a locator component plant, as described in detail infra, for a subsequent configuration of the embedded historians.

Figure 2:
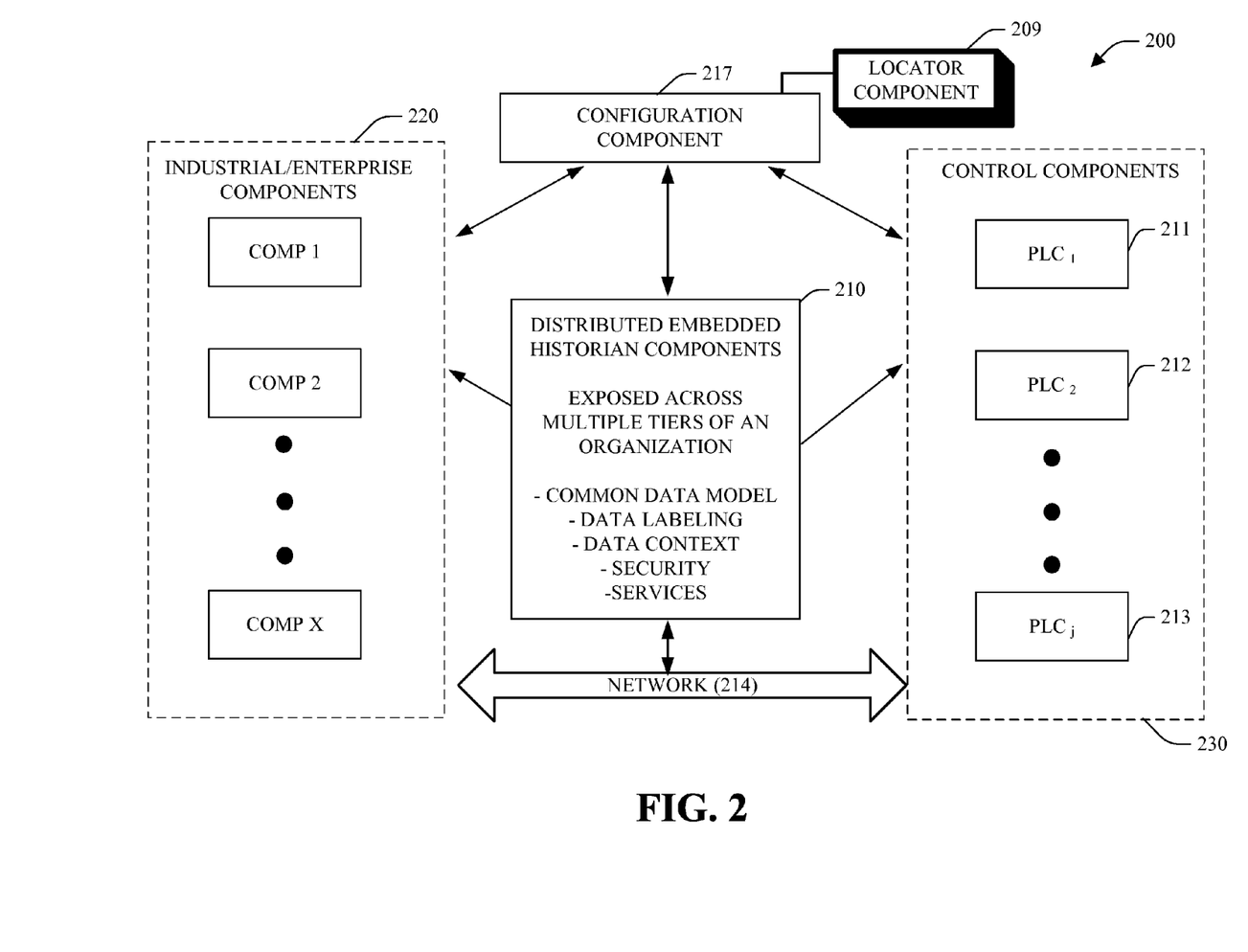
FIG. 2 illustrates a block diagram for a configuration component with a locator component in accordance with an aspect of the subject invention.

FIG. 2 illustrates a block diagram of a configuration component 217 that employs a locator component 209, to identify distributed embedded historian components 210 that are to be configured in accordance with an aspect of the subject innovation. For example, such locator component 209 can detect embedded historians that are to be configured and are distributed on the back plane of an industrial network. The locator component 209 can be part of applications running with the configuration component 217, and/or on the control components 211, 212, 213 which can function as a management control center for the industrial network system 200. Accordingly, a distributed embedded historian framework is provided, wherein historical data types can be collected based on configurations of the embedded historian, which are set by the configuration component 217 (e.g., in accordance with an organizational model of a hierarchical system that is distributed across various elements of an enterprise)—such that when a plant comes on-line, the embedded historians announce their presence to the industrial plant 200, and are discovered thereby. A directory service (not shown) can further operate with the organizational model to enable configuration of embedded historians via the configuration component 217 within the organization. For example, the configuration component 217 can further automatically propagate the embedded historian's configuration and/or changes to other embedded historians and units on the factory floor.

A network system 214 can be associated with the industrial automation system 200, which can be searched via the locator component 209. The network system can further include additional hosts (not shown), which may be personal computers, servers or other types of computers. Such hosts generally can be capable of running or executing one or more application-level (or user-level) programs, as well as initiating an I/O request (e.g., I/O reads or writes). In addition, the network system can further include one or more input/output units (I/O units), wherein such I/O units can includes one or more I/O controllers connected thereto, and each of the I/O can be any of several types of I/O devices, such as storage devices (e.g., a hard disk drive, tape drive) or other I/O device. The hosts and I/O units and their attached I/O controllers and devices can be organized into groups such as clusters, with each cluster including one or more hosts and typically one or more I/O units (each I/O unit including one or more I/O controllers). The hosts and I/O units can be interconnected via a collection of routers, switches and communication links (such as wires, connectors, cables, and the like) that connects a set of nodes (e.g., connects a set of hosts and I/O units) of one or more clusters.

It is noted that as used in this application, terms such as "component," "hierarchy," "model," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components can reside within a process and/or thread of execution and a component may be localized on one computer and/or distributed between two or more computers, industrial controllers, and/or modules communicating therewith.

Figure 3:
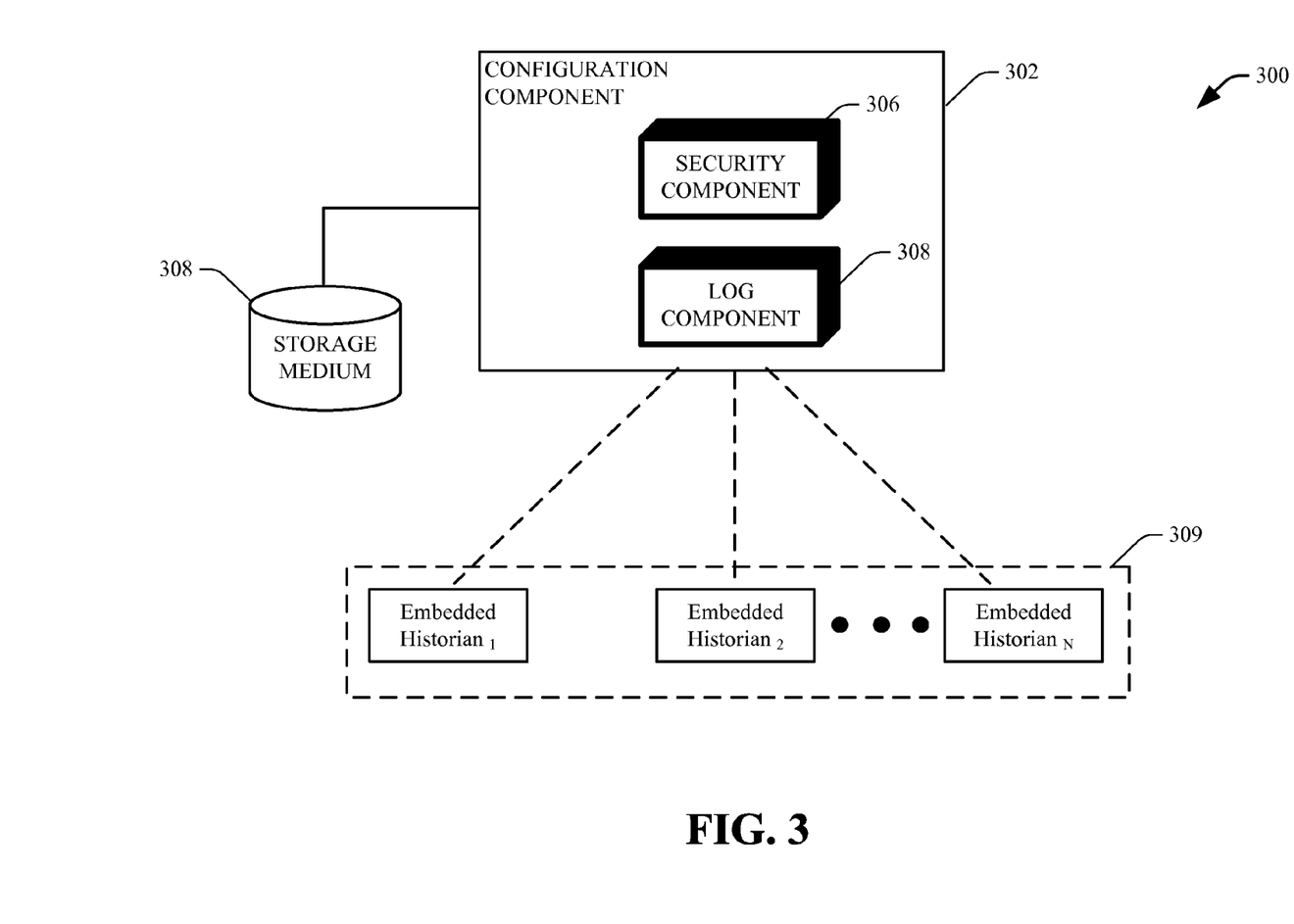
FIG. 3 illustrates a security and log component as part of the configuration component.

FIG. 3 illustrates an exemplary aspect of the subject innovation, wherein the configuration component 302 includes a security component 306 that restricts access to the distributed embedded historians 309 (1 to L, wherein L is an integer) and respective configurations. The security component 306 can supply security at a granular level and/or global manner based at least in part upon the hierarchically structured data model that is employed within the industrial setting 300. For example, the security component 306 can define security, authorization, and/or privileges in accordance with the physical hierarchy of the embedded historians and/or industrial units associated therewith, wherein sectors and/or portions of the environment can be associated to a specific security level. For instance, an embedded historian that collects data from a particular subcell can be assigned one security level with distinct security authorizations and/or privileges, while another embedded historian and/or another cell can have a security level with disparate security authorizations and/or privileges. Other levels of security can also exist, wherein numerous embedded historians and/or areas associated with each level of security can exist. Moreover, the security component 306 provides granular security and/or privileges to the system 300, wherein at least a portion of the hierarchically structured data model is protected. It is to be appreciated that security component 306 can be a stand-alone component, incorporated into the configuration 302, and/or any combination thereof.

The configuration component 302 can further employ a log component 308 that tracks configuring/programming related manipulations of the embedded historians 309. Such log component 308 can be a stand-alone component, separate from the configuration component 302, and/or any combination thereof. For example, if one user employs the configuration component 302 to edit a device and/or variable name, the log component 308 can track the user (e.g., via IP address, network address, user name, computer name), date and time of configuration, and setting change implemented. Moreover, the log component 308 can log various aspects related to data manipulations such as for example, versions of hierarchically structured data models, edits to names, configuration settings, security settings, time stamps related to modifications, dates related to manipulations, user names and/or computer names related to data changes, and the like. In addition, the log component 306 can store the logged entries in storage medium 318. Such storage medium 318 can include, read only memory (ROM), programmable ROM (PROM), electrically programmable ROM (EPROM), electrically erasable programmable ROM (EEPROM), or flash memory, static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM), for example.

Figure 4:
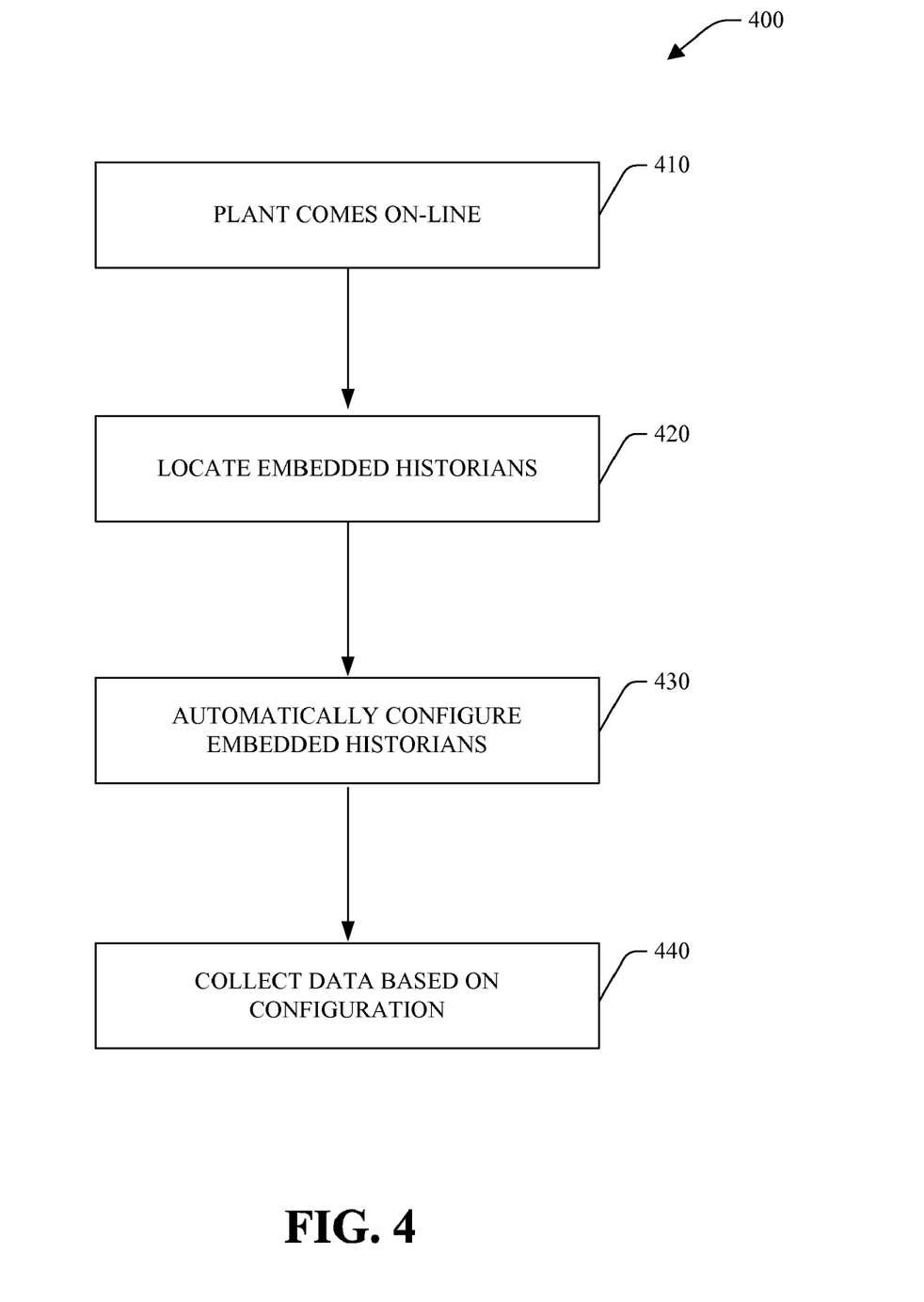
FIG. 4 illustrates an exemplary methodology for embedded historian configuration and data collection in accordance with an aspect of the subject innovation.

FIG. 4 illustrates an exemplary methodology 400 in accordance with an aspect of the subject innovation. While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described. Initially and at 410, an industrial plant that employs a plurality of embedded historians comes on-line. Subsequently, such embedded historians can be located at 420. For example, a locator component can locate the embedded historians, and/or the embedded historians can identify themselves to the configuration component as explained in detail supra. At 430, such embedded historians can be configured according to a predetermined setting. For example, tags in an embedded historian can be automatically created, and be set up as a default collection for a plant scan, such that when a plant comes on-line, the embedded historians announce their presence to such plant, and are discovered thereby. Moreover, the configuration of the embedded historians can include, editing process variables, automation device names, creating tag references, data models, hierarchy, simulation of industrial processes, and the like. Based on such configuration, embedded historians can subsequently collect data related to the industrial process at 440.

Figure 5:
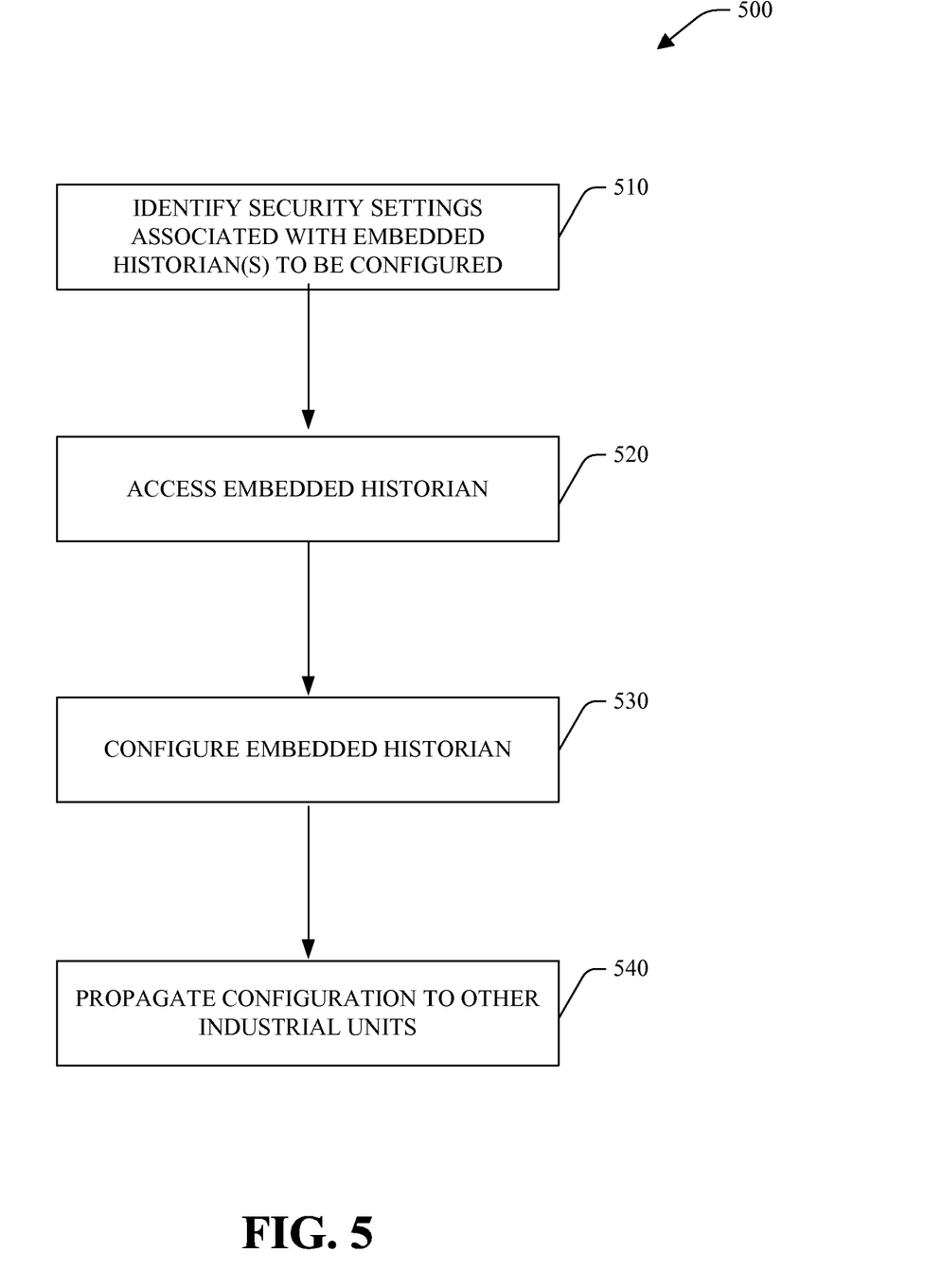
FIG. 5 illustrates a related methodology of propagating embedded historian configurations within the industrial plant.

FIG. 5 illustrates a related methodology 500 in accordance with an aspect of the subject innovation. Initially and at 510 security settings with an embedded historian to be configured can be identified. For example, security settings can be provided at various levels in from of a granular level and/or at a global level for configuring the embedded historians; wherein access; authorization, and/or privileges can be restricted and monitored. Next and at 520, such embedded historian can be accessed via the configuration component for programming settings. At 530 the embedded historian can be configured automatically to incorporate predetermined settings associated therewith. Such configuration can further automatically propagate to other embedded historians and associated units on the factory floor, at 540.

Figure 6:
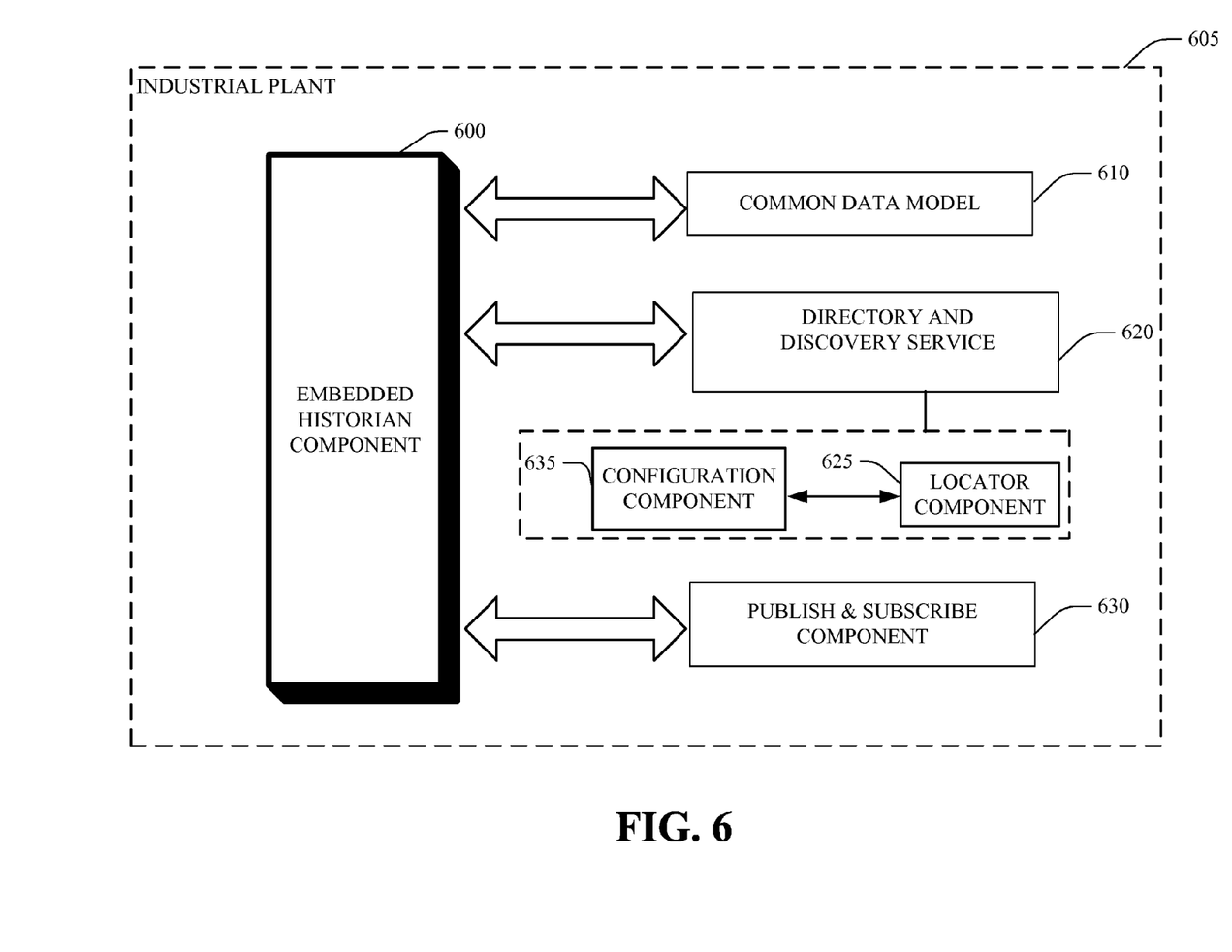
FIG. 6 illustrates an exemplary industrial automation network that employs a configuration component for configuring embedded historians in a hierarchical organizational model.

FIG. 6 illustrates a configuration component 635 that is connected to a locator component 625, which interact with the embedded historian network/embedded historians 600 in accordance with an aspect of the subject innovation. The industrial setting 605 can employ a hierarchical data model with various level; e.g., enterprise level, site level (factory represented within a data packet), area level (an area within the factory associated with the data); line level (a line associated with particular data), a work-cell level (that indicates a work-cell associated with the data) and the like. For example by employing a nested, hierarchical data model, embedded historian components 600 can readily become aware of data associated therewith. Furthermore, such hierarchy can further be customized by users to obtain increased granularity within the hierarchy. The common plant model can enable the embedded historian component 600 to determine data contexts in an automated manner. The common data model 610 allows data to be marked or labeled via metadata for example to both expose embedded historian functionality to a system and/or to allow the embedded historian component 600 to be automatically integrated within the system according to data that is exposed to the embedded historian component. For example, one such labeling can pertain to security, and typically can affect substantially all components in the system associated with the common model 610.

The configuration component 635 and the locator component 625 can be associated with a directory and discovery service. Such an arrangement enables the embedded historian component 600 to be located and identified to the configuration component 635, for a configuration thereof. The locator component 615 can further identify other embedded historian components in the system and to receive/expose historian data to other system components. This can include a network directory that determines physical addresses from logical names and vice versa, for example. Moreover, the publish and subscribe component 630 can provide subscription functionality to the embedded historian component 600, wherein data collection efficiency of the system can be enhanced. For example, the publish and subscribe component 630 of the system 605 allows data to be published or generated when a change in the data has been detected. Thus, the embedded historian component 600 can subscribe to such change events and thus only record data when a change has occurred which reduces the amount of data to be stored. Furthermore, the locator component 625 can employ a trail of metadata to identify embedded historians and relevant historian data for collection. Additionally, a polling/publication arrangement can also be employed wherein the embedded historians (e.g., micro-historians) identify themselves to the locator component for a configuration thereof, upon occurrence of a predetermined event, and/or periodically.

Figure 7:
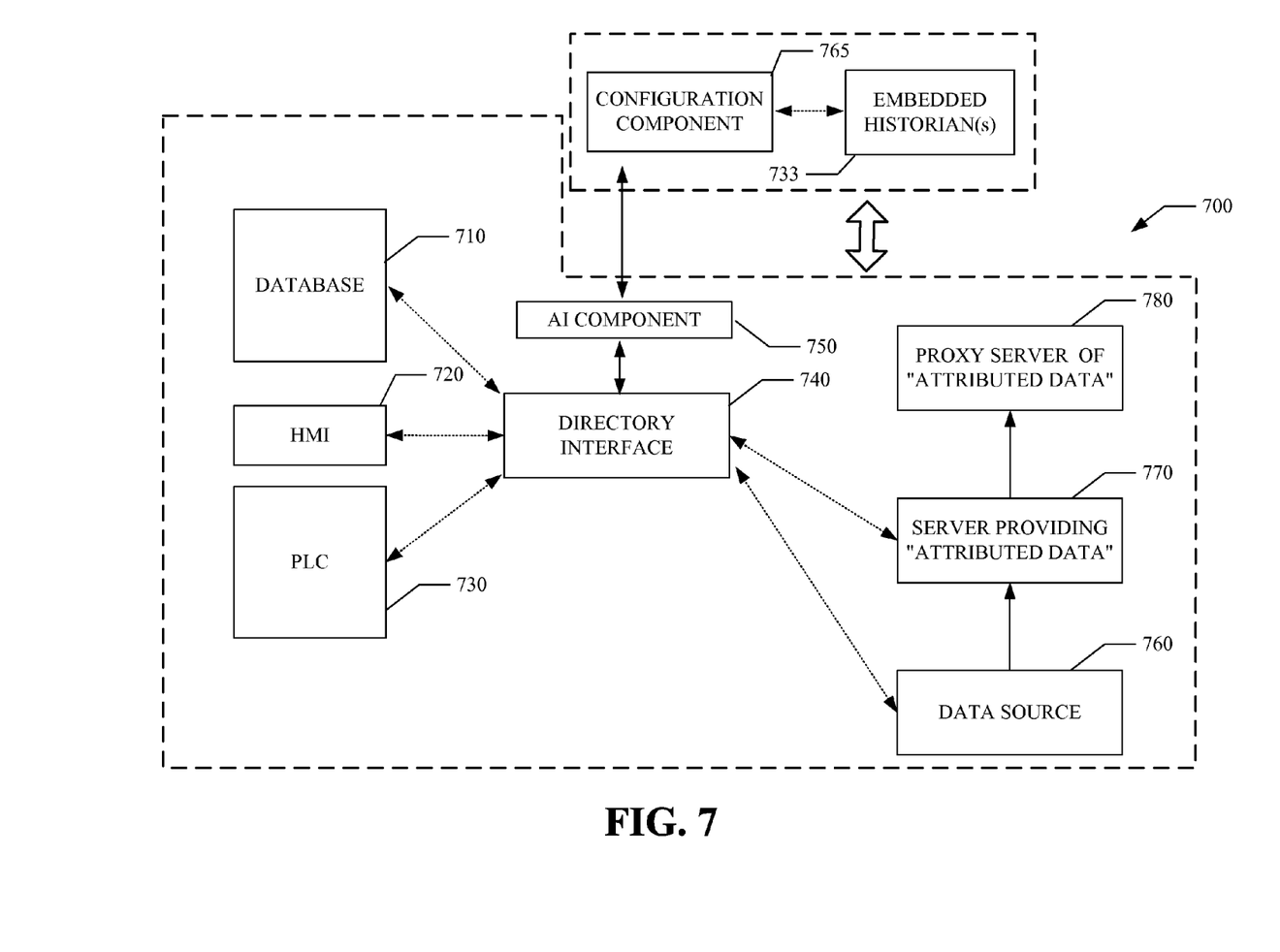
FIG. 7 illustrates a configuration component as part of an industrial setting in accordance with an aspect of the subject innovation.

FIG. 7 illustrates an exemplary industrial automation network that employs a configuration component 765 that configures an embedded historian component 733. Such configuration supplies predetermined settings for the embedded historian component 733, and enable high speed data collection (e.g., real time) from the industrial setting 700. The industrial setting 700 can include a database 710, a human machine interface (HMI) 720 and a programmable logic controller (PLC) 730, and a directory interface 740. The directory interface 740 can further associate with an Artificial Intelligence (AI) component 750 to facilitate efficient identification of desired data within a particular network/application. The directory interface 740 can be employed to provide data from an appropriate location such as the data source 760, a server 770 and/or a proxy server 780. Accordingly, the directory interface 740 can point to a source of data based upon role and requirements (needs) of a requester (e.g., database 710, HMI 720, PLC 530, and the like.) The database 710 can be any number of various types such as a relational, network, flat-file or hierarchical systems. Typically, such databases can be employed in connection with various enterprise resource planning (ERP) applications that can service any number of various business related processes within a company. For example, ERP applications can be related to human resources, budgeting, forecasting, purchasing and the like. In this regard, particular ERP applications may require data that has certain desired attributes associated therewith. Thus, in accordance with an aspect of the subject invention, the directory interface 740 can provide data to the database 710 from the server 770, which provides data with the attributes desired by the database 710.

As illustrated in FIG. 7, the embedded historian 733 can leverage directory interface 740 and other Unified Plant Model (UPM) services to locate other embedded historian components and their configurations, via the locator component of the subject innovation. Such locator component can further detect embedded historians 733 that are distributed on the back plane of an industrial network. The locator component 760 can be part of applications running on a control unit, which can function as a management control center for the industrial network system.

Moreover, the HMI 720 can employ the directory interface 740 to point to data located within the system 700. The HMI 720 can be employed to graphically display various aspects of a process, system, factory, etc. to provide a simplistic and/or user-friendly view of the system. Accordingly, various data points within a system can be displayed as graphical (e.g., bitmaps, jpegs, vector based graphics, clip art and the like) representations with desired color schemes, animation, and layout.

The HMI 720 can request data to have particular visualization attributes associated with data in order to easily display such data thereto. For example, the HMI 720 can query the directory interface 740 for a particular data point that has associated visualization attributes. The directory interface 740 can determine the proxy server 780 contains the attributed data point with the desired visualization attributes. For instance, the attributed data point can have a particular graphic that is either referenced or sent along with the data such that this graphic appears within the HMI environment instead of or along with the data value.

As explained earlier, the PLC 730 can be any number of models such as Allen Bradley PLC5, SLC-500, MicoLogix, and the like. The PLC 730 is generally defined as a specialized device employed to provide high-speed, low-level control of a process and/or system. The PLC 730 can be programmed using ladder logic or some form of structured language. Typically, the PLC 730 can utilize data directly from a data source (e.g., data source 760) that can be a sensor, encoder, measurement sensor, switch, valve and the like. The data source 760 can provide data to a register in a PLC and such data can be stored in the PLC if desired. Additionally, data can be updated (e.g., based on a clock cycle) and/or output to other devices for further processing.

Figure 8:
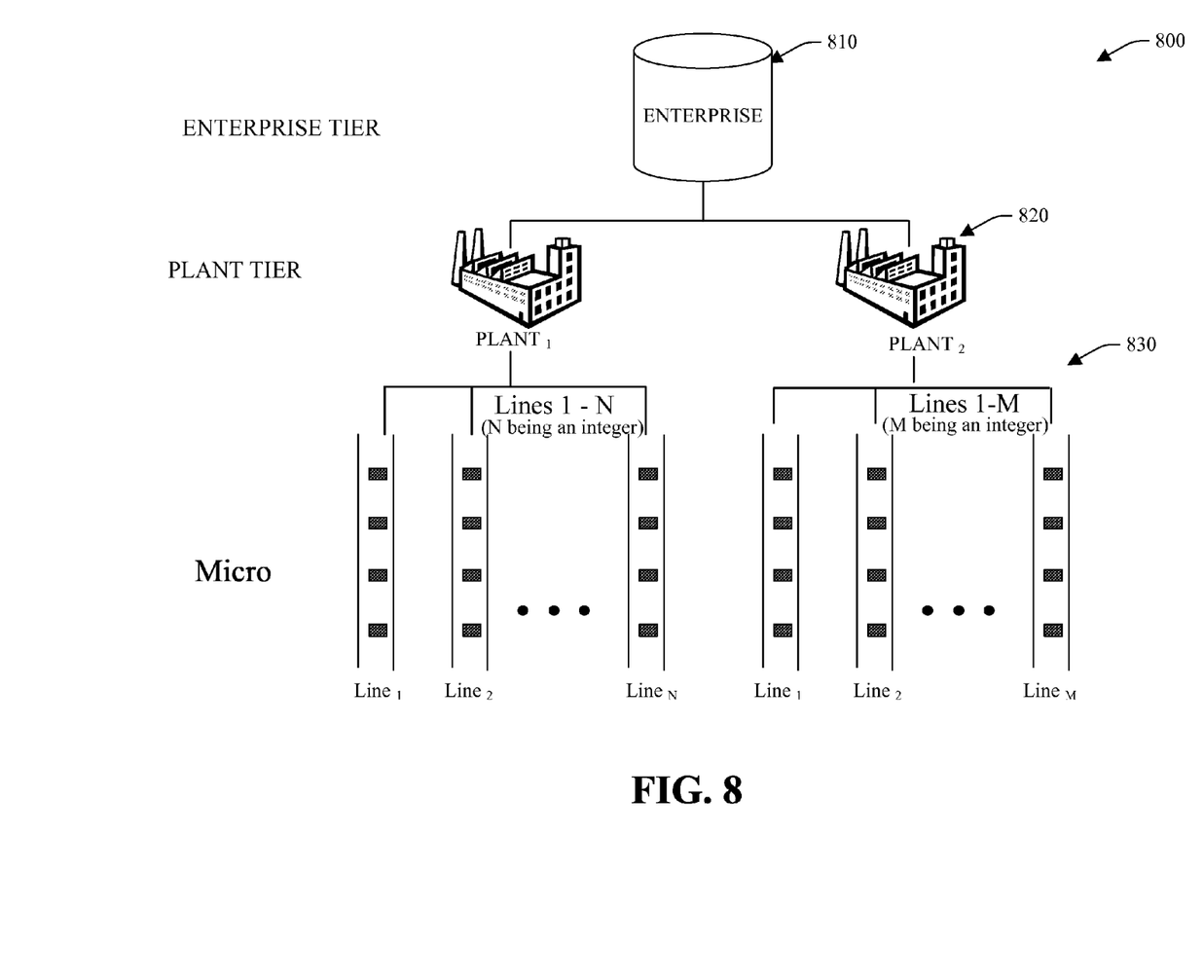
FIG. 8 illustrates an exemplary multi-tiered and distributed historian system, which can employ a configuration component in accordance with an aspect of the subject innovation.

FIG. 8 illustrates an exemplary multi-tiered and distributed embedded historian system 800, which can be configured in accordance with an aspect of the subject innovation. The exemplary system 800 illustrates three tiered historian level, wherein the highest data collection tier is illustrated and can be referred to as the enterprise tier 810. This tier aggregates data collected from lower level tiers such as from a plant tier 820 and a micro or embedded tier 830. As illustrated, the tiers 810 and 820 can include archival or permanent storage capabilities. In the system 800, data can be collected from two plants at the tier 820, and from a plurality of embedded historian components at tier 830. It is to be appreciated that such an arrangement is exemplary in nature, and other arrangements are well within the realm of the subject innovation.

Typically, the system 800 can be viewed as a distributed embedded historian that spans machines, plants, and enterprises. At level 830, the historian collects data at the rack level and is coupled to Common Plant Data Structure described above. Such can include collecting process & discrete data, alarms & events in a single archive if desired. Other aspects can include auto-discovery of data and context from controllers in local chassis including store/forward data capabilities from local buffers. Data can be collected without polling, having a low communications bandwidth. The plant level 820 aggregates data from Micro or rack-embedded historians and/or other data sources (e.g., Live Data source). Such can include plant-level querying, analytics, reporting while efficiently storing, retrieving, and managing large amounts of data. This level can also auto-discover data and data model context from Micro Historians located at level 830. Other features of the system 800 can include analysis components, logical units, components for interaction with report elements, embeddable presentation components, replication of configuration, storage, archiving, data compression, summarization/filtering, security, and scalability.

Figure 9:
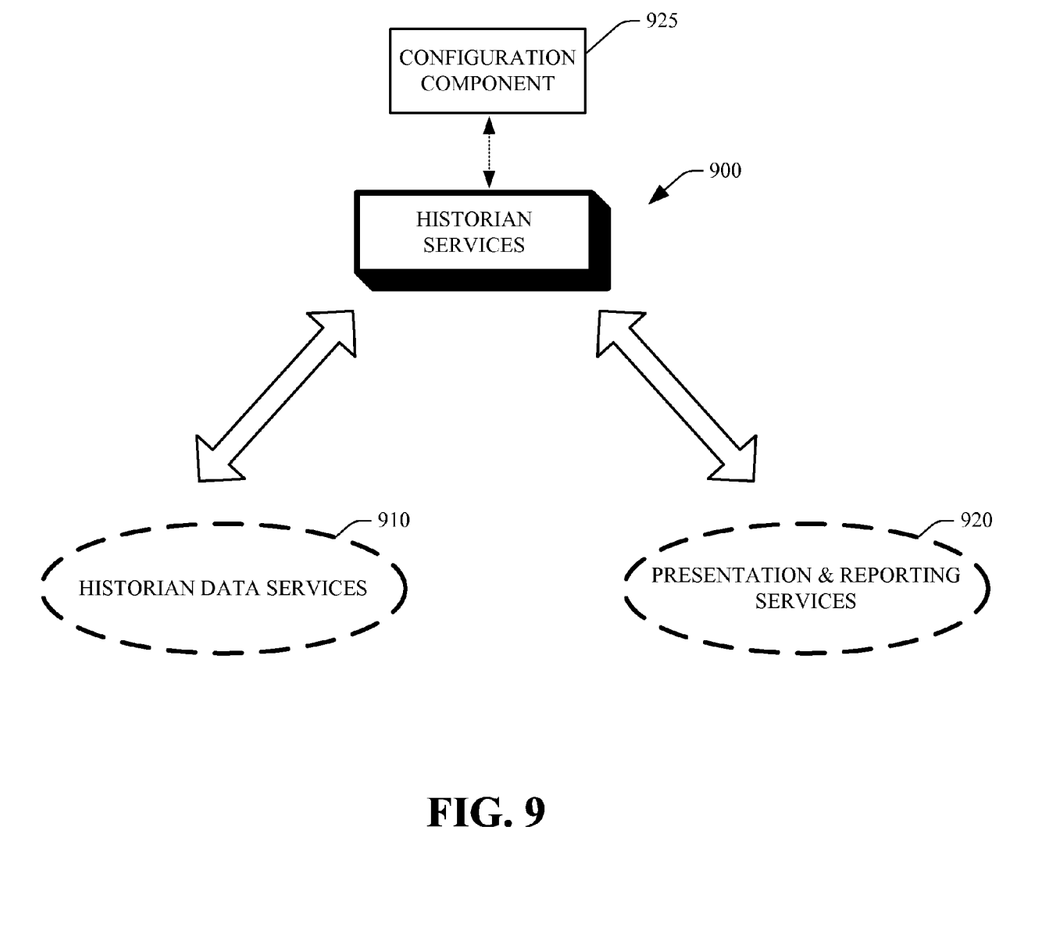
FIG. 9 illustrates a configuration component that configures embedded historian with presentation and reporting services.

FIG. 9 illustrates an embedded historian services 900 that can be configured via the configuration component 925 as described in detail supra. The configuration component 925 can include historian data services 910 and presentation and reporting services 920. Historian Data Services 910 (HDS) can supply generic, customizable services for collecting and storing data with plant model-defined context. This can include configuration of data to be collected e.g., tags, data context, alarms, events, diagnostics, SOE data and configuration of data to be forwarded to a higher level. Collection of data can be from disparate sources including storage of data, retrieval of data, and management of data. Management of data collected by/residing in other data stores (e.g., higher-level business systems, 3rd party products) can be processed by the respective applications. The presentation and reporting services 920 (PRS) can supply generic, customizable services for collating and presenting data in a common plant model-defined context. This can include access to stored data, analysis/calculators and query mechanisms, and embeddable, interactive presentation components (e.g., text, charts, SPC). The service 910 can generate reports with various means of presentation/distribution (e.g., web, email) having export capabilities to standard formats (e.g., XML, Excel).

Figure 10:
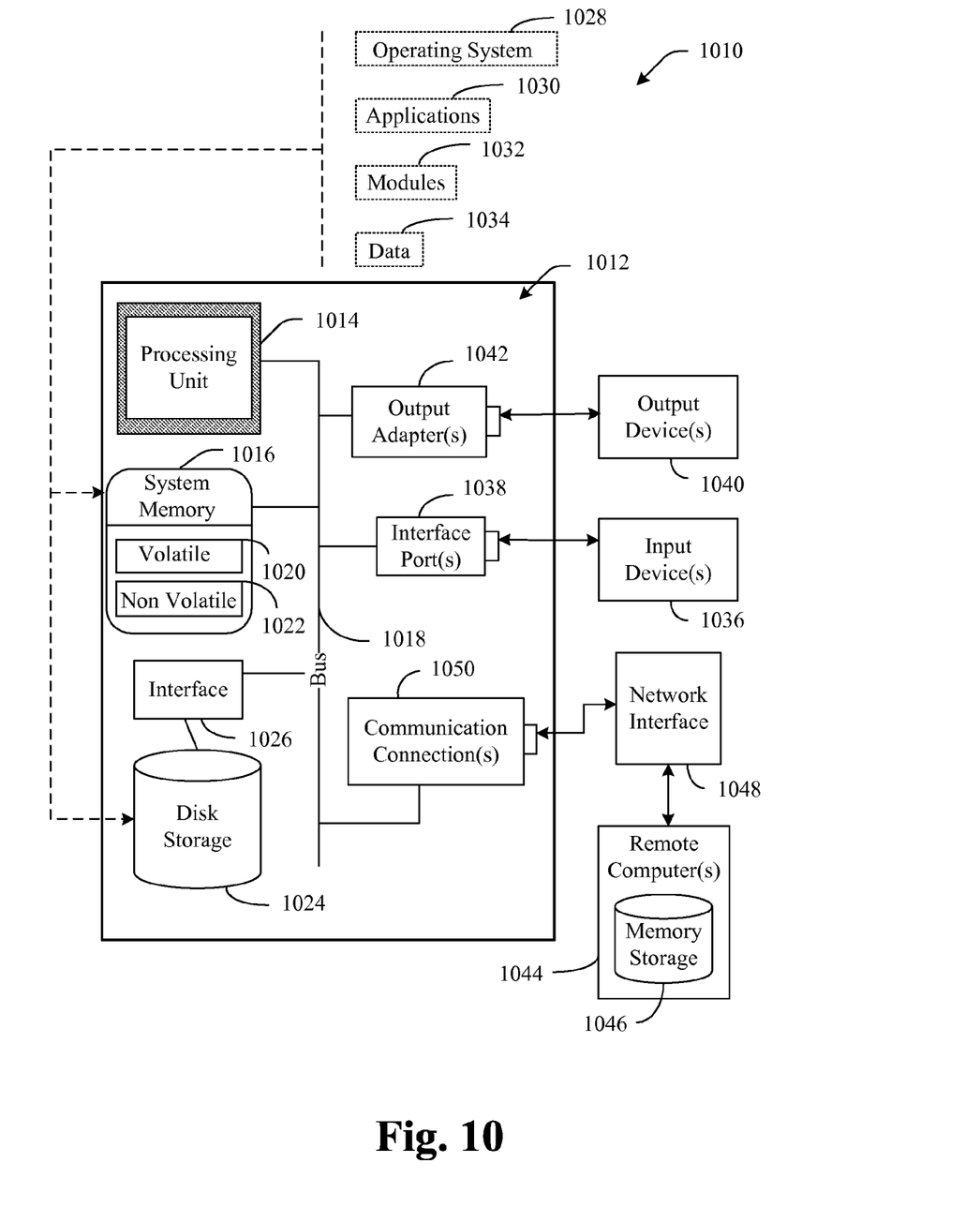
FIG. 10 illustrates an exemplary computing environment that can be implemented as part of a configuration component in accordance with an aspect of the subject innovation.

FIG. 10 illustrates an exemplary environment 1010 for implementing various aspects of the configuration component, which can include computer 1012, in accordance with an aspect of the subject innovation. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-60 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that various components described herein can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Figure 11:
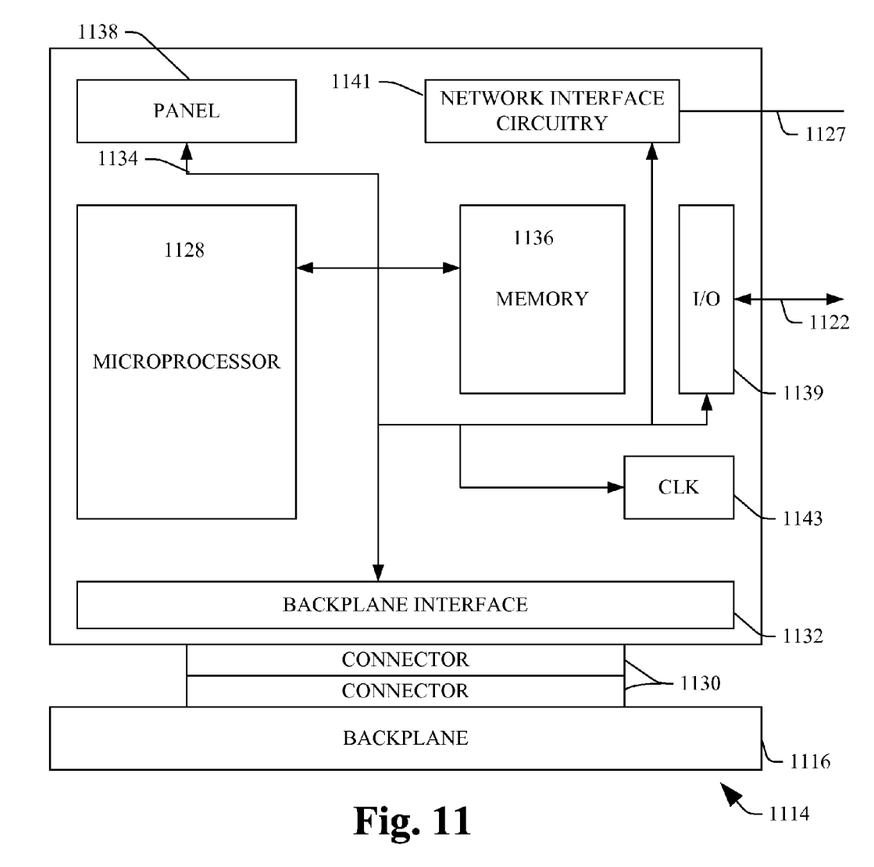
FIG. 11 illustrates an industrial setting with a backplane and associated modules that can employ a configuration component in accordance with an aspect of the subject innovation.

FIG. 11 also illustrates an exemplary environment that can employ a configuration component in accordance with various aspects of the subject innovation. Each functional module 1114 is attached to the backplane 1116 by means of a separable electrical connector 1130 that permits the removal of the module 1114 from the backplane 1116, so that it may be replaced or repaired without disturbing the other modules 1114. The backplane 1116 provides the module 1114 with both power and a communication channel to the other modules 1114. Local communication with the other modules 1114 through the backplane 1116 is accomplished by means of a backplane interface 1132 which electrically connects the backplane 1116 through connector 1130. The backplane interface 1132 monitors messages on the backplane 1116 to identify those messages intended for the particular module 1114, based on a message address being part of the message and indicating the message destination. Messages received by the backplane interface 1132 are conveyed to an internal bus 1134 in the module 1114.

The internal bus 1134 joins the backplane interface 1132 with a memory 1136, a microprocessor 1128, front panel circuitry 1138, I/O interface circuitry 1139 and communication network interface circuitry 1141. The microprocessor 1128 can be a general purpose microprocessor providing for the sequential execution of instructions included within the memory 1136 and the reading and writing of data to and from the memory 1136 and the other devices associated with the internal bus 1134. The microprocessor 1128 includes an internal clock circuit (not shown) providing the timing of the microprocessor 1128 but may also communicate with an external clock 1143 of improved precision. This clock 1143 may be a crystal controlled oscillator or other time standard including a radio link to an external time standard. The precision of the clock 1143 may be recorded in the memory 1136 as a quality factor. The panel circuitry 1138 includes status indication lights such as are well known in the art and manually operable switches such as for locking the module 1114 in the off state.

The memory 1136 can comprise control programs or routines executed by the microprocessor 1128 to provide control functions, as well as variables and data necessary for the execution of those programs or routines. For I/O modules, the memory 1136 may also include an I/O table holding the current state of inputs and outputs received from and transmitted to the industrial controller 1110 via the I/O modules 1120. The module 1114 can be adapted to perform the various methodologies of the innovation, via hardware configuration techniques and/or by software programming techniques.

What has been described above includes various exemplary aspects. It is, of course, not possible to describe every conceivable combination of components or methodologies for purposes of describing these aspects, but one of ordinary skill in the art may recognize that many further combinations and permutations are possible. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the innovation. In this regard, it will also be recognized that the innovation includes a system as well as a computer-readable medium having computer-executable instructions for performing the acts and/or events of the various methods of the innovation. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation system, comprising:
    an embedded historian component that supplies historical data for a process to a control component, the embedded historian is part of a hierarchically structured data model for the industrial automation system; and
    a configuration component that automatically configures the embedded historian based on settings required by the process and in accordance with the hierarchically structured data model,
    wherein memory operatively coupled to a processor retains at least one of the embedded historian component or the configuration component.

2. The industrial automation system of claim 1 further comprising a locator component that employs a trail of metadata to identify the embedded historian component and verify a respective configuration setting.

3. The industrial automation system of claim 1 further comprising an organizational hierarchy data model with nodes that represent units associated with the industrial automation system.

4. The industrial automation system of claim 2 the locator component operatively connected to a directory service to facilitate discovery service.

5. The industrial automation system of claim 1 further comprising an artificial intelligence component that facilitates configuration of the embedded historians.

6. The industrial automation system of claim 1 further comprising a Human Machine Interface (HMI) to graphically display a view of the industrial automation system.

7. The industrial automation system of claim 1 further comprising a graphical user interface (GUI) that forms an application view of an embedded historian data collection system.

8. The industrial system of claim 1, the embedded historian component associated with at least one of a controller, a module in a chassis, a server, a sensor, and a factory component.

9. The industrial system of claim 3, the organizational hierarchy data model with metadata for identification of embedded historians to the locator component.

10. The industrial system of claim 1, further comprising a publish and subscribe component that identifies embedded historians to the locator component.

11. A method of locating embedded historians within an industrial plant comprising:
    detecting an embedded historian via a locator component;
    employing at least one processor to execute computer executable instructions for configuring the embedded historian based in part on a hierarchically structured data model via a configuration component; and
    at least one of automatically creating or modifying a tag in the embedded historian based in part on the configuration;
    propagating configuration of the embedded historian to other industrial units.

12. The method of claim 11 further comprising employing metadata to facilitate a trail to the embedded historian.

13. The method of claim 11 further comprising defining a common organizational data model for the industrial plant.

14. The method of claim 11 further comprising employing a directory to track source of data.

15. The method of claim 11 further comprising collecting historian data across various levels of the industrial plant.

16. The method of claim 11 further comprising employing a polling mechanism for embedded historian detection and identification.

17. The method of claim 11 further comprising defining a security level for accessing the embedded historian and configuration thereof.

18. The method of claim 11 further comprising incorporating the configuration component as part of a controller associated with the industrial setting.

19. The method of claim 11 further comprising self identifying the embedded historian to the configuration component.

20. A computer implemented system comprising the following computer executable components:
    a configuration component that configures embedded historians based on predetermined settings, the configuration includes at least one of editing or creating at least one of process variables, automation device names, tag references, data models, hierarchy, or simulation of industrial processes; and
    a locator component that detects the embedded historians for an identification thereof to the configuration component
    wherein memory operatively coupled to a processor retains at least one of the configuration component or the locator component.

21. The computer implemented system of claim 20 further comprising a security component that restricts access to the embedded historians.

22. The computer implemented system of claim 20 further comprising a log component that tracks configuration related manipulations of the embedded historians.

23. The computer implemented system of claim 20 further comprising a data base that services the embedded historians.

24. The computer implemented system of claim 20, the configuration component is part of an application that runs on a control unit of the industrial plant.

25. The computer implemented system of claim 20 further comprising a directory that determines where a source or destination for a particular embedded historian data structure is located.

26. The computer implemented system of claim 20 further comprising a publish and subscribe component to identify embedded historians to the configuration component.

27. An industrial controller system comprising:
   collection means for collecting data related to an industrial process, the collection means is part of a hierarchically structured data model for an industrial automation system; and
   means for automatically configuring the collection means and propagating a configuration to other units based in part on the hierarchically structured data model.

28. The industrial controller system of claim 27 further comprising means for graphically displaying a view of an industrial control system.

29. The industrial controller system of claim 27 further comprising means for restricting access to the collection means.

30. The industrial controller system of claim 28 further comprising means for logging configuration related manipulations of the collection means.

31. The industrial controller system of claim 27 further comprising means for representing units associated with the industrial plant as nodes.

* * * * *